UNITED STATES PATENT OFFICE.

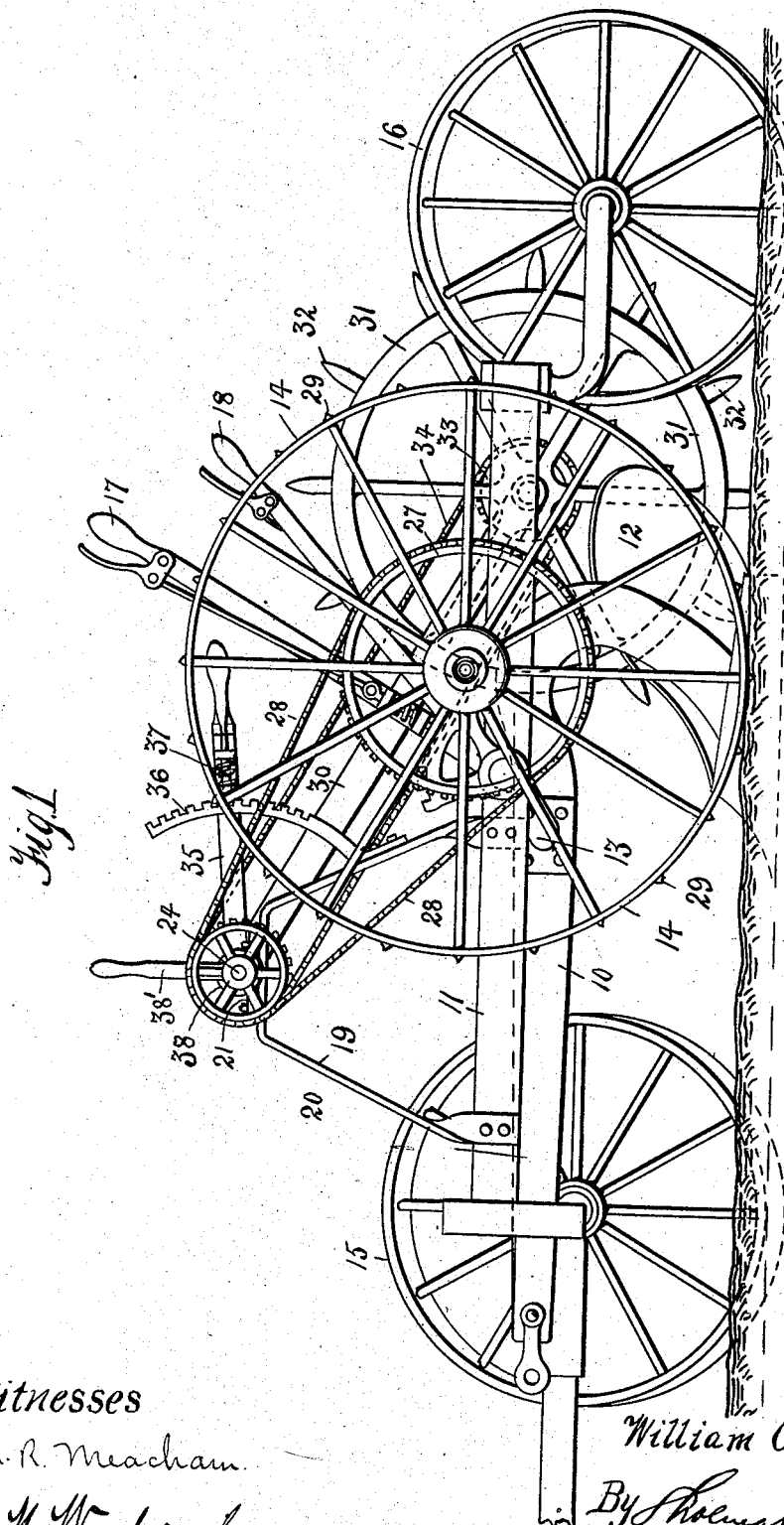

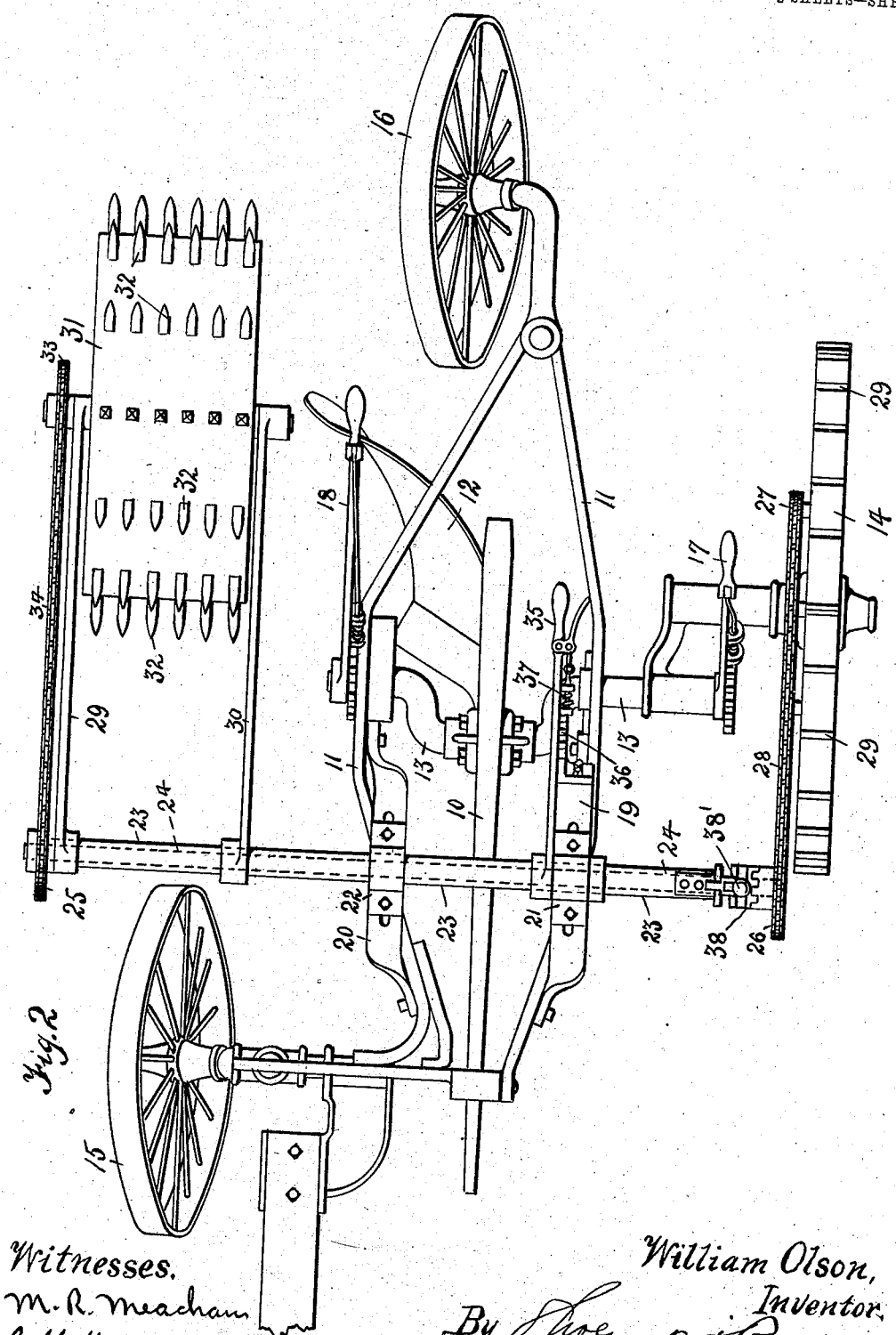

WILLIAM OLSON, OF BROWNTOWN, WISCONSIN.

PULVERIZER ATTACHMENT FOR PLOWS.

No. 894,743.  Specification of Letters Patent.  Patented July 28, 1908.

Application filed February 6, 1908. Serial No. 414,600.

*To all whom it may concern:*

Be it known that I, WILLIAM OLSON, a citizen of the United States, residing at Browntown, in the county of Green and State of Wisconsin, have invented certain new and useful Improvements in Pulverizer Attachments for Plows, of which the following is a specification.

This invention relates to pulverizer attachments to plows, more particularly to sulky plows, either "single" or "gang" form, and has for its object to provide a simply constructed and easily applied attachment, whereby the soil adjacent to the plows, or the freshly turned furrows, are pulverized simultaneously with the over-turning of the soil.

With these and other objects in view, the invention consists in certain novel features of construction as hereafter shown and described and specifically pointed out in the claims.

For the purpose of illustrating the embodiment of the invention, the improved apparatus is shown applied to a conventional form of a sulky plow, and in the drawing thus employed, Figure 1 is a side elevation of a sulky plow from the "land" side, with the improved apparatus applied. Fig. 2 is a plan view of the same.

The sulky plow employed for illustrating the embodiment of the invention comprises the usual beam 10, frame 11 carrying the plow 12, the frame supporting the usual crank axle 13 to which the beam 10 is attached. The crank axle carries the land wheel 14, and the frame 11 carries the furrow wheels 15—16.

The axle 13 is provided with the usual adjusting lever device represented at 17 to control the land wheel, and also provided with the usual adjusting lever device represented at 18 to control the positions of the beam and plow, so that the depth of the furrow may be controlled or the plow elevated from the land for transportation, in the ordinary manner.

Extending from the frame 11 are standards 19—20, the standards having adjustable boxes 21—22 for supporting a tubular member 23. Extending through the tubular member is a shaft 24 having sprocket wheels 25—26 at its ends, as shown.

The land wheel 14 is provided with a sprocket wheel 27 connected to the sprocket wheel 26 by a chain 28, so that the rotary motion of the land wheel will be communicated to the shaft 24. The land wheel is also provided with the usual "mud ribs" 29, to prevent the wheel from slipping.

Connected to the tubular member 23 at the opposite end thereof from the wheel 26 are spaced bars 29—30, the bars being rigidly connected to the tubular member and carrying a drum 31 at their free ends, the drum provided with numerous spikes or pulverizer elements 32, as shown.

One of the journals of the drum 31 is extended and provided with a sprocket wheel 33 connected to the sprocket wheel 25 by a chain 34, so that the motion of the shaft 24 will be communicated to the drum.

Rigidly connected to the tubular member 23 is a lever 35 and extending from the standard 19 is a notched segment 36 with which a spring pawl 37 on the lever 35 engages, so that the arm may be adjusted relative to the segment and thus support the drum 31 at any desired point relative to the land to be pulverized, or to elevate the drum and hold it free of the land when required.

The tubular member 23 and the shaft 24 may be of any required length so as to space the drum 31 at any required distance from the plow, and thus act upon any required portion of the plowed land.

A clutch device 38 of ordinary construction is arranged between the shaft 24 and the sprocket wheel so that the drum actuating mechanism may be thrown out of gear when required, there being a lever 38′ operable for this purpose. By this simple arrangement it will be obvious that the land which has been recently plowed will be pulverized at the same time that the over-turning of the unplowed land is continued, so that the land will be pulverized as fast as it is plowed, thus saving materially in time and labor.

While I have shown the preferred arrangement of the parts to accomplish the desired result, it will be understood that I do not desire to be limited thereto, as changes may be made in the construction and arrangement of the parts within the scope of the appended claims, without departing from the spirit of the invention or sacrificing any of the advantages.

Having thus described the invention, what is claimed as new is:—

1. The combination with a sulky plow including a frame and ground wheels, of standards carried by the frame, a tubular element carried by said standards in advance of the ground wheels, a shaft extending through said tubular element in the rear of the axis of said ground wheels, means for imparting motion of the ground wheels to said shaft, means for imparting the motion of said shaft to said pulverizer, and means for adjusting said tubular element upon said standards.

2. The combination with a sulky plow including a frame and the ground wheels, of a tubular element mounted upon the frame, a shaft mounted for rotation in said tubular element, a pulverizer, means connecting the tubular element and the pulverizer, means for adjusting the tubular member upon the frame, and means for operating said shaft.

3. The combination with a sulky plow including a frame and ground wheels, of standards carried by said frame, a tubular element carried by said standards, means for adjusting said tubular element upon said standards, a pair of bars secured to said tubular element, a rotary pulverizer journaled in said bars, a shaft extending through said tubular element, means for imparting the motion of the ground wheels to said shaft, and means for imparting the motion of said shaft to said pulverizer.

4. The combination with a sulky plow including a frame and ground wheels, a tubular element mounted upon said frame, a shaft extending through said tubular element, a pair of bars secured to the tubular element, a rotary pulverizer journaled in said bars, whereby the pulverizer is secured to the plow independently of the axis of the ground wheels, means for imparting the motion of the ground wheels to said shaft, and means for imparting the motion of said shaft to said pulverizer.

5. The combination with a sulky plow including a frame and ground wheels, of standards carried by said frame, a tubular element mounted in said standards, a shaft mounted for rotation in said tubular element, a rotary pulverizer suspended from said tubular element, means for imparting the motion of said ground wheels to said shaft, means for imparting the motion of said shaft to said pulverizer, a notched segment extending from one of said standards, a lever connected to said tubular element, and a spring pawl carried by said lever and engaging said segment.

6. The combination with a sulky plow including a frame and ground wheels, standards carried by said frame, a tubular element carried by said standards, means for adjusting said tubular element upon said standards, a shaft extending through said tubular element, a rotary pulverizer suspended from said tubular element, means for imparting the motion of the ground wheels to said shaft, and means for imparting the motion of said shaft to said pulverizer.

In testimony whereof I affix my signature, in presence of two witnesses.

WILLIAM OLSON.

Witnesses:
   JOHN JONES,
   JOHNSON POWELL.